United States Patent [19]

Sakata

[11] Patent Number: 5,086,408
[45] Date of Patent: Feb. 4, 1992

[54] METHOD AND APPARATUS FOR MERGING

[75] Inventor: Akiharu Sakata, Kokubunji, Japan

[73] Assignee: Hitachi, Ltd., Tokyo, Japan

[21] Appl. No.: 192,134

[22] Filed: May 10, 1988

[30] Foreign Application Priority Data

May 13, 1987 [JP] Japan .................. 62-114600

[51] Int. Cl.⁵ .................................. G06F 7/14
[52] U.S. Cl. ...................... 395/600; 364/962; 364/962.2; 364/DIG. 2
[58] Field of Search ... 364/200 MS File, 900 MS File

[56] References Cited

U.S. PATENT DOCUMENTS

| | | | |
|---|---|---|---|
| 3,540,000 | 11/1970 | Bencher | 364/200 |
| 4,209,845 | 6/1980 | Berger et al. | 364/900 |
| 4,382,277 | 5/1983 | Glaser et al. | 364/200 |
| 4,536,857 | 8/1985 | Schoenmakers | 364/900 |
| 4,779,192 | 10/1988 | Torii et al. | 364/200 |

OTHER PUBLICATIONS

"Sorting and Searching", vol. 3, pp. 251-253, by Knuth, copyrighted by Addison-Wesley Publishing Company in 1973.

Primary Examiner—Eddie P. Chan
Attorney, Agent, or Firm—Antonelli, Terry, Stout & Kraus

[57] ABSTRACT

A method and apparatus for merging a plurality of input data strings employ a unit to execute a vector processing for two-way merging to carry out merging iteratively, while setting the number of vector elements for the merging unit for the input data strings, deliver the result of merging, and, when a certain number of vacant areas become available in a input data area, load the certain number of data of the associated input data string to the vacant areas. Delivery of the merged result and loading of an input data string to the input data area take place in parallel.

17 Claims, 20 Drawing Sheets

FIG. 10

| NODE | PARENT | CHILD 1 | CHILD 2 | COUNTER | DATA TOP | FLAG |
|------|--------|---------|---------|---------|----------|------|
| A | * | B | C | | | 0 |
| B | A | D | E | | | 0 |
| C | A | F | G | | | 0 |
| D | B | * | * | | | 1 |
| E | B | * | * | | | 1 |
| F | C | * | * | | | 1 |
| G | C | * | * | | | 1 |

FIG. 15

| NODE | PARENT | CHILD 1 | CHILD 2 | COUNTER | TOP OF TAGGED KEY DATA | TOP OF INPUT DATA AREA | FLAG 1 | FLAG 2 |
|---|---|---|---|---|---|---|---|---|
| a | * | b | c | | | A | 0 | * |
| b | a | d | e | | | * | 0 | * |
| c | a | f | g | | | * | 0 | * |
| d | b | * | * | | | D | 1 | |
| e | b | * | * | | | E | 1 | |
| f | c | * | * | | | F | 1 | |
| g | c | * | * | | | G | 1 | |

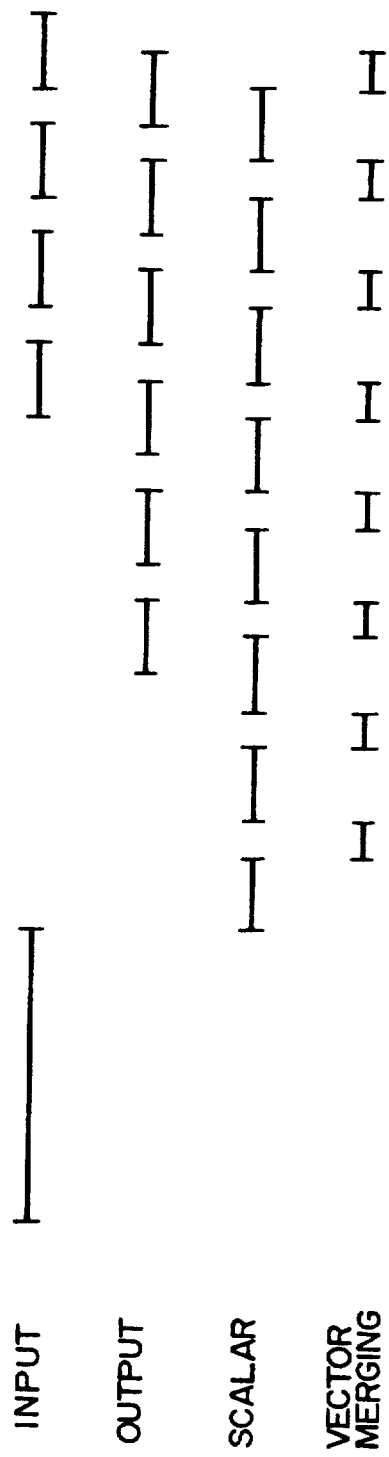

METHOD AND APPARATUS FOR MERGING

BACKGROUND OF THE INVENTION

This invention relates to a method and apparatus of merging and, particularly, to a method and apparatus of merging suitable for multiple-way merging.

The merging process is defined to be rearrangement of a plurality of data strings, each arranged under a same law, into a single data string in compliance with the same law. An example of merging process is to re-arrange a plurality of numeric strings each arranged in the ascending order of numerals to a numeric string in the ascending order of numerals. Other merging processes include re-arrangement of character strings each in the alphabetic order to a character string in the alphabetic order. An application of merging process is seen in the commercial process, in which the quantities of commodities sold in a day are listed in the order of commodity number at the end of the day.

There has been known a vector merging processor which is capable of performing two-way merging, for example, in which two input data strings are merged through the provision of working areas in the main storage including two areas each for storing one of the input data strings and an area with a capacity of two input data strings for storing the result of merging. This processor, however, necessitates working areas which are twice the volume of two input data strings, and therefore it is not suitable for merging mass data. The above-mentioned vector merging process signifies merging a plurality of vector data.

A merging technique which resembles the above-mentioned prior art is disclosed in JP-A-60-134973 (corresponding to U.S. Pat. Application Ser. No. 685,116 "Vector Processor"now U.S. Pat. No. 4,779,192). A software-oriented multiple-way merging technique is described in an article entitled "Sorting and Searching", Vol. 3, pp. 251-253, published by Knuth, copyrighted by Addison-Wesley Publishing Co. in 1973, in which the manner of "replacement selection" is used to produce an element of output at one time.

SUMMARY OF THE INVENTION

An object of this invention is to provide a method and apparatus for merging a large quantity of input data of the vector type using small working areas in parallel fashion for data input and result output with a long vector length being retained. The vector-type data signifies a group of data of the same type.

According to one aspect of this invention, with the intention of achieving the above objective, input data is merged in units smaller than a certain number of data by executing a vector processing involving two-way merging, the result is delivered, and further input data is introduced when room for a certain amount of data becomes available in an input data area. Input areas and an output area of the working areas (and an intermediate area in the case of merging three-ways or more) are used to implement merging in units of vector elements on the basis of the number of data entered in a parent area where the result of two-way merging is stored, and the result of merging is delivered. This scheme enables the working areas to have a capacity independent of the number of data, whereby mass data can be merged using smaller working areas.

BRIEF DESCRIPTION OF THE DRAWINGS

FIG. 10 is a table showing the relationship between the working areas of the embodiment of FIG. 7;

FIGS. 12-1 and 12-2 are examples of the merging process based on the embodiment of FIG. 7;

FIG. 15 is a table showing the relationship between the working areas of the embodiment of FIG. 13;

FIGS. 16-1, 16-2 and 16-3 are diagrams of data flow based on the embodiment of FIG. 13; and FIG. 17 is a timing chart of the embodiments of this invention.

DESCRIPTION OF THE PREFERRED EMBODIMENTS

Embodiments of this invention will now be described with reference to the drawings.

Figure 1:
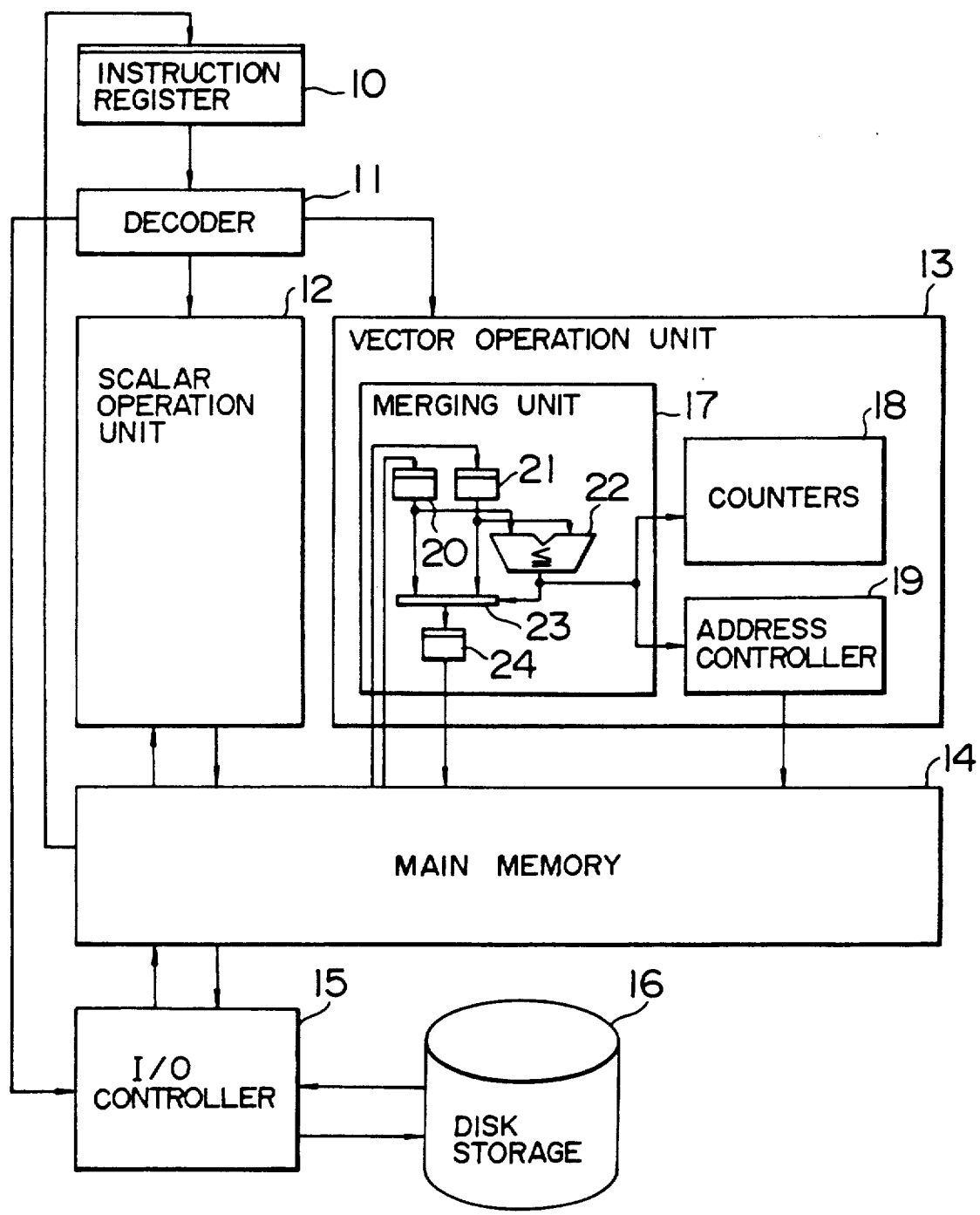
FIG. 1 is a block diagram of the merging apparatus embodying the present invention.

FIG. 1 is a block diagram of the merging apparatus which forms an embodiment of this invention. In the figure, indicated by 10 is an instruction register, 11 is a decoder, 12 is a scalar computation unit, 13 is a vector computation unit, 14 is a main memory, 15 is an I/O control circuit, 16 is a disk storage, 17 is a merging operation unit, 18 are counters, 19 is an address control circuit, 20 and 21 are input registers, 22 is a comparator, 23 is a selector, and 24 is an output register.

In this embodiment, mass data to be merged is stored in advance in the disk storage 16, and it is loaded into the main memory 14 by the I/O control circuit 15. After the data is merged by the scalar computation unit 12 and vector computation unit 13, the result is stored in the disk storage 16. The merging apparatus of FIG. 1 is operative to carry out the inventive merging methods which will be described later.

Figure 2:
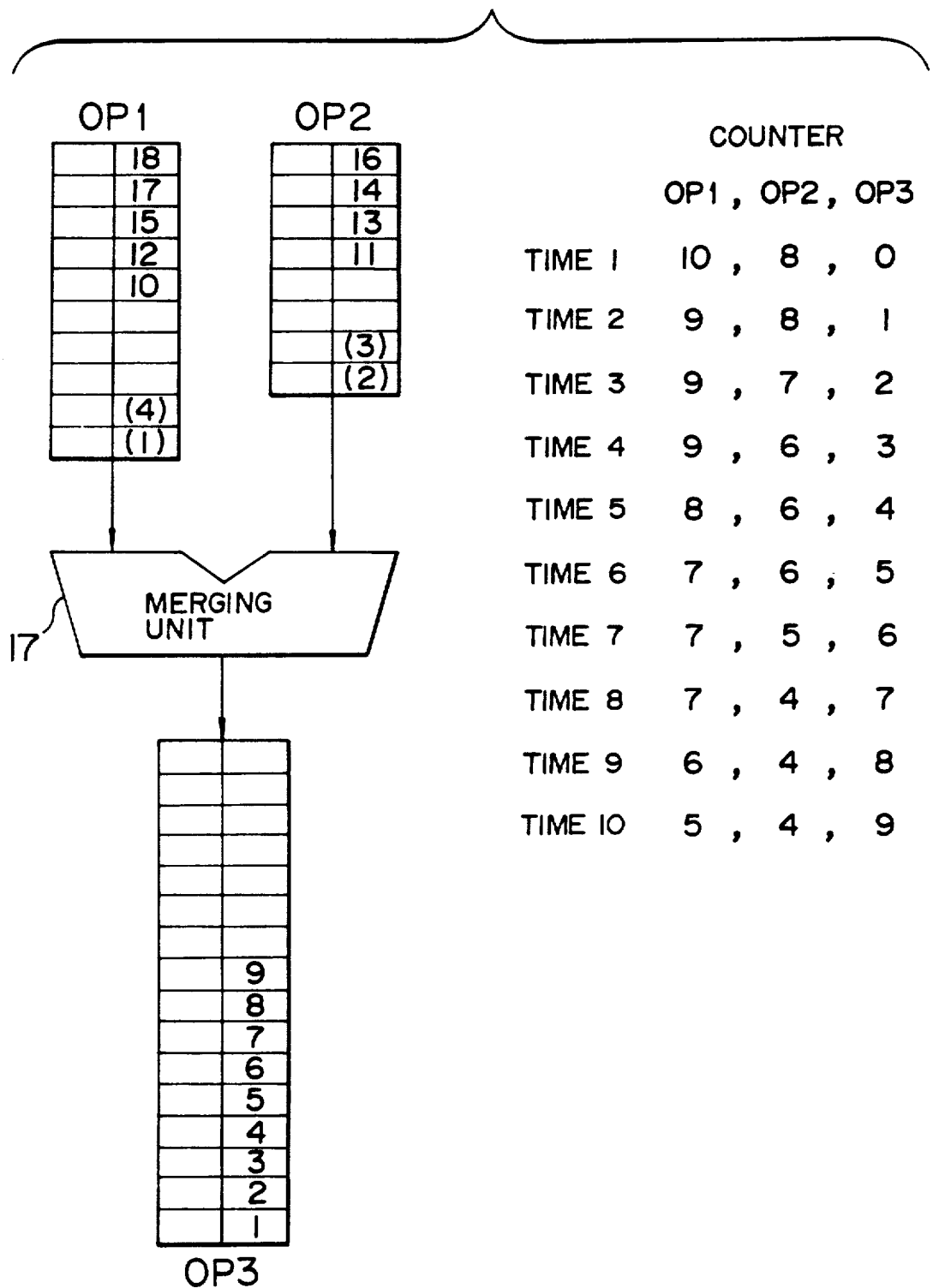
FIG. 2 is a diagram showing the operation of the merging unit used in the merging apparatus of FIG. 1.

FIG. 2 shows the operation of the merging unit 17 in FIG. 1, in which the state shown in the left half of the diagram is for time 10 of the counter shown in the right half. Indicated by OP1, OP2 and OP3 are working areas in the main memory 14. The numerals enclosed in parentheses, i.e., (1)–(4), in OP1 and OP2 are for the purpose of explanation, and actually they have been sent to OP3 and are absent in OP1 and OP2 at time 10. The OP1 and OP2 represent input data of numeric strings each sorted in descending order, and OP3 represents output data. At time 1, OP1 contains 10 pieces of data, OP2 contains 8 pieces of data, and OP3 contains no data. At time 2, the comparator 22 in the merging unit 17 compares the values of data in OP1 and OP2, and a piece of data in OP1 is transferred to OP3. Namely, in this example, 1 stored in OP1 is compared with 2 stored in OP2, and the smaller 1 in OP1 is transferred to OP3. Following the transfer operation, the counter of OP1 is decremented by 1, the counter of OP2 is left unchanged, and the counter of OP3 is incremented by 1 in the counter circuit 8. Consequently, OP1 contains 9 pieces of data, OP2 contains 8 pieces of data, and OP3 contains 1 piece of data at time 2. The operation proceeds successively. Namely, at the transition from time n to time n+1, data in OP1 and OP2 are compared, and if data of OP1 is smaller than data of OP2, the OP1 counter is decremented by 1, the OP2 counter is left unchanged, and the OP3 counter is incremented by 1. If, on the other hand, data of OP1 is greater than data of OP2, the OP1 counter is left unchanged, the OP2 counter is decremented by 1, and the OP3 counter is incremented by 1. In FIG. 2 the output area OP3 has a capacity for 16 pieces of data and the input areas OP1 and OP2 have capacities for 10 and 8 pieces of data, respectively, for the explanatory purpose, and it should be noted that the actual output area is smaller than the input areas.

Figure 3:
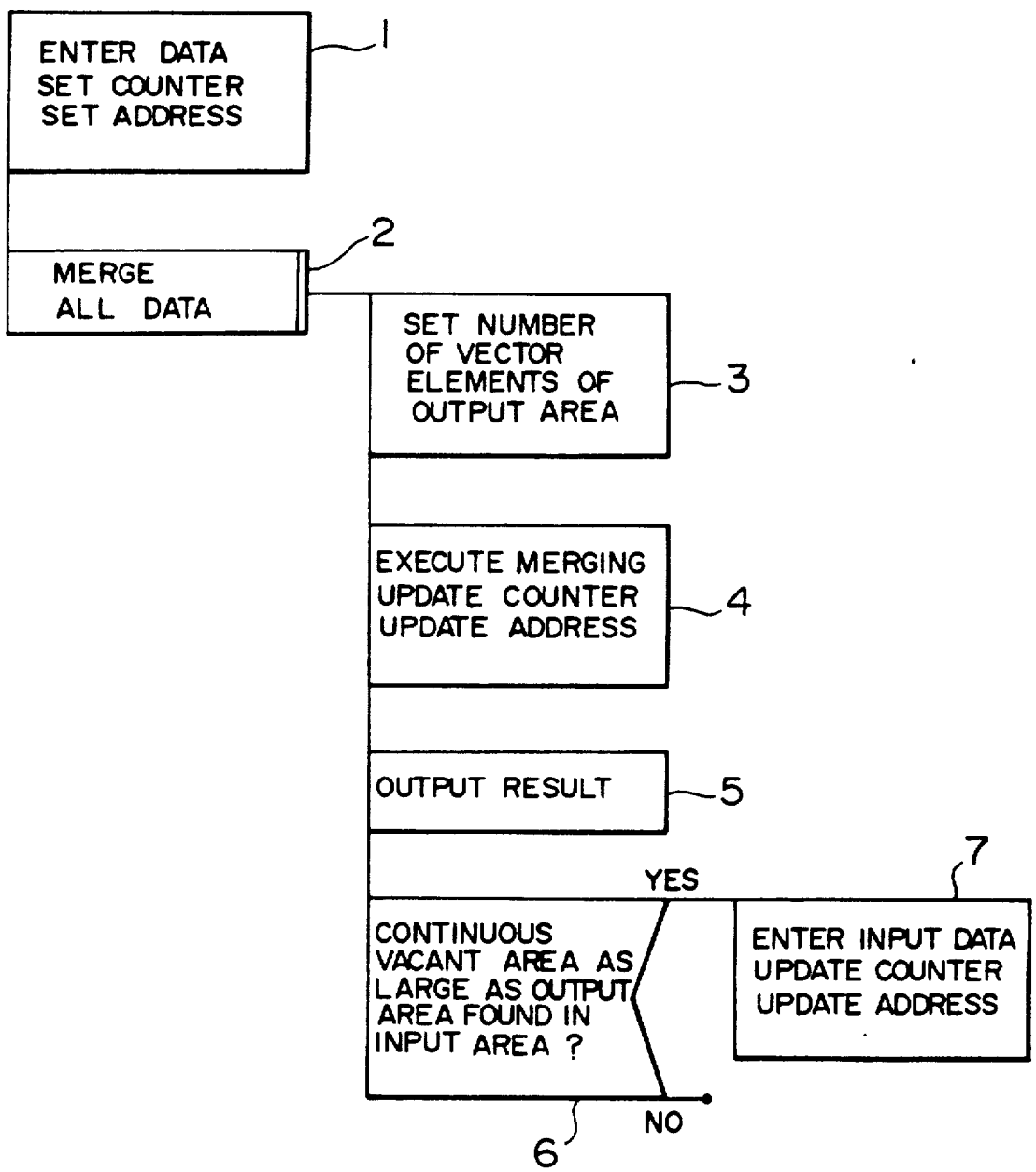
FIG. 3 is a diagram showing the algorithm of the first embodiment of the inventive merging method.
Figure 4:
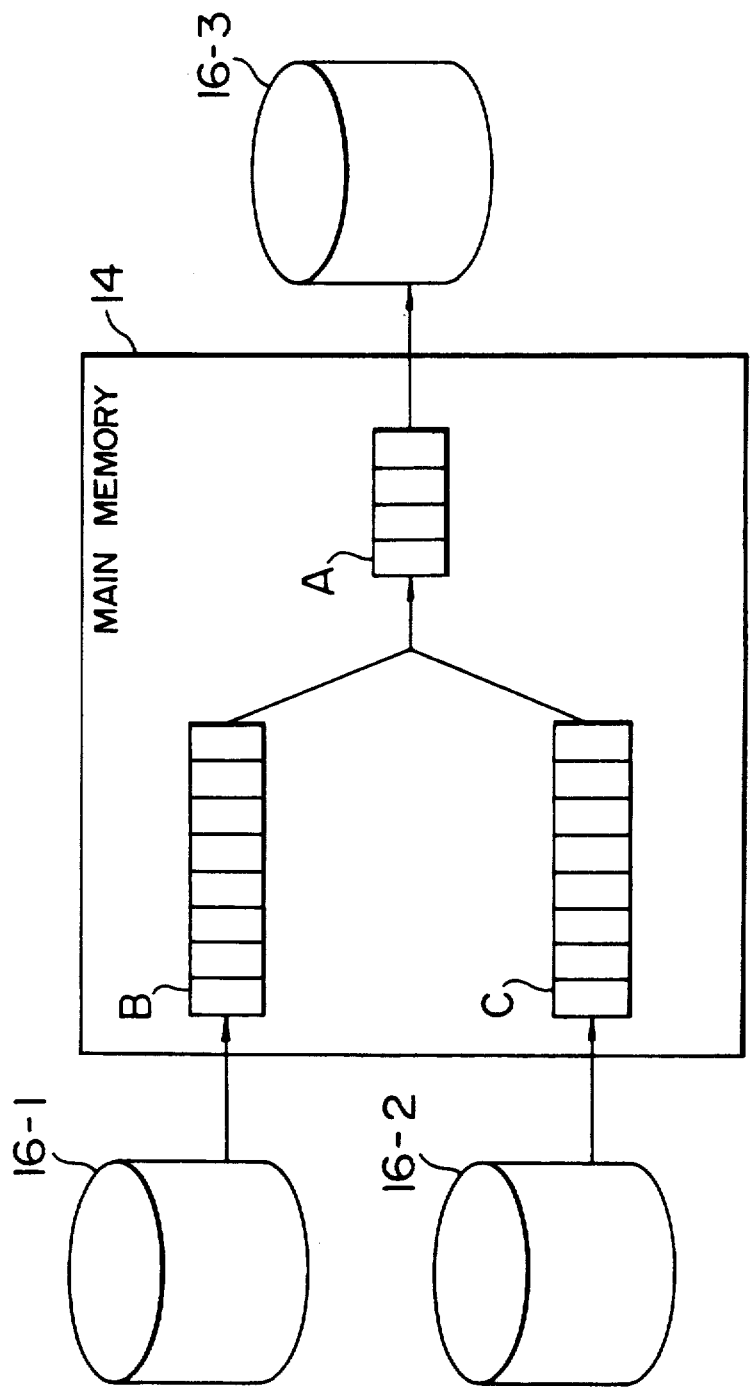
FIG. 4 is a diagram showing the working areas of the embodiment of FIG. 3.

FIG. 3 is a diagram showing the algorithm of the first embodiment of the inventive merging method, and FIG. 4 is a diagram showing the relationship between the disk storages and the working areas in the main memory. FIG. 3 will be explained with reference to FIG. 4. The main memory 14 in FIG. 4 is the main memory 14 in FIG. 1, and the disk storages 16-1, 16-2 and 16-3 are equivalent to the disk storage 16. The main memory 14 has a section A which is assigned to the output area (i.e., used to store the result of merging), and has sections B and C which are assigned to the input areas. Each of the areas B and C is twice the capacity of the area A, although the former areas may be greater than twice the latter area.

In step 1 of FIG. 3, it is indicated that data in disk storages 16-1 and 16-2 is loaded into the areas B and C, respectively, and the data counters 18 and the start addresses of both input data are set. It step 2, it is indicated that step 3 and following steps are repeated until merging for all data completed. In step 3, it is indicated that the number of data entered to the output area A in FIG. 4 is set as a number of vector elements of two-way merging. In other words, the vector operation unit 17 performs two-way merging for pieces of data equal in number to the number of vector elements. In step 4, it is indicated that data in the areas B and C are merged and the result is stored in the area A, with the counters 18 and addresses being updated accordingly. In step 5, it is indicated that data in the area A is stored in the disk storage 16-3. Step 6 is to test whether a vacant area as large as the area A is available in the area B or C. If the area is found available, the control sequence proceeds to step 7 for the entry of data and updating of the counters and addresses, or if the area is not available, nothing takes place.

The steps 6 and 7 ensure that there always exists in B and C at least a piece of data to be entered to A at the execution of merging in step 4, and the merging process of step 4 is not terminated. Accordingly, it is possible for data with a long vector length to be merged directly.

The areas A, B and C are fixed in location and size and are independent of the number of data. On this account, it is possible to merge mass data in the form of a given vector length using a small working areas, and to perform the input and output operations independently or in parallel to each other.

Figure 5:
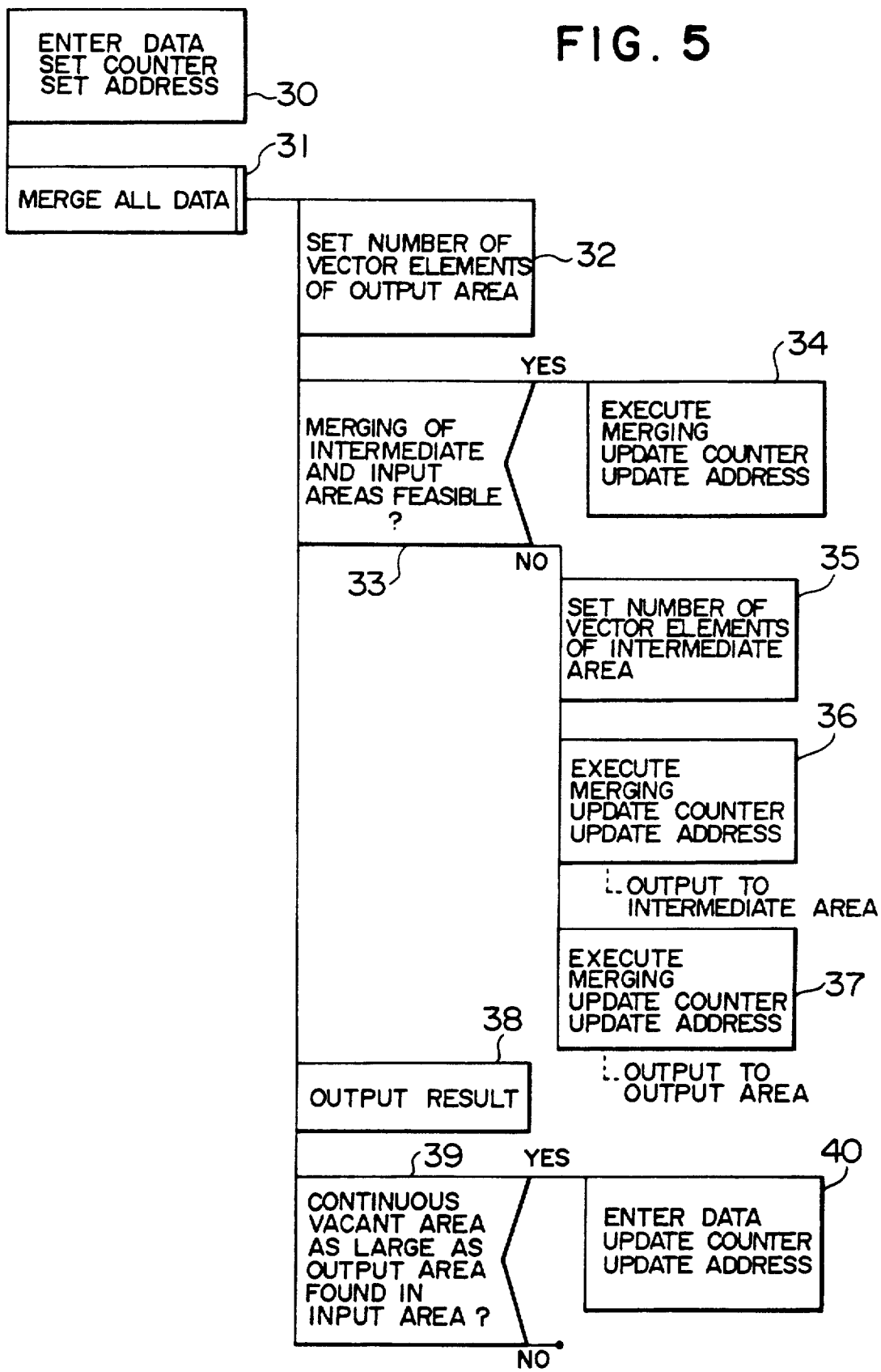
FIG. 5 is a diagram showing the algorithm of the second embodiment of the inventive merging method.
Figure 6:
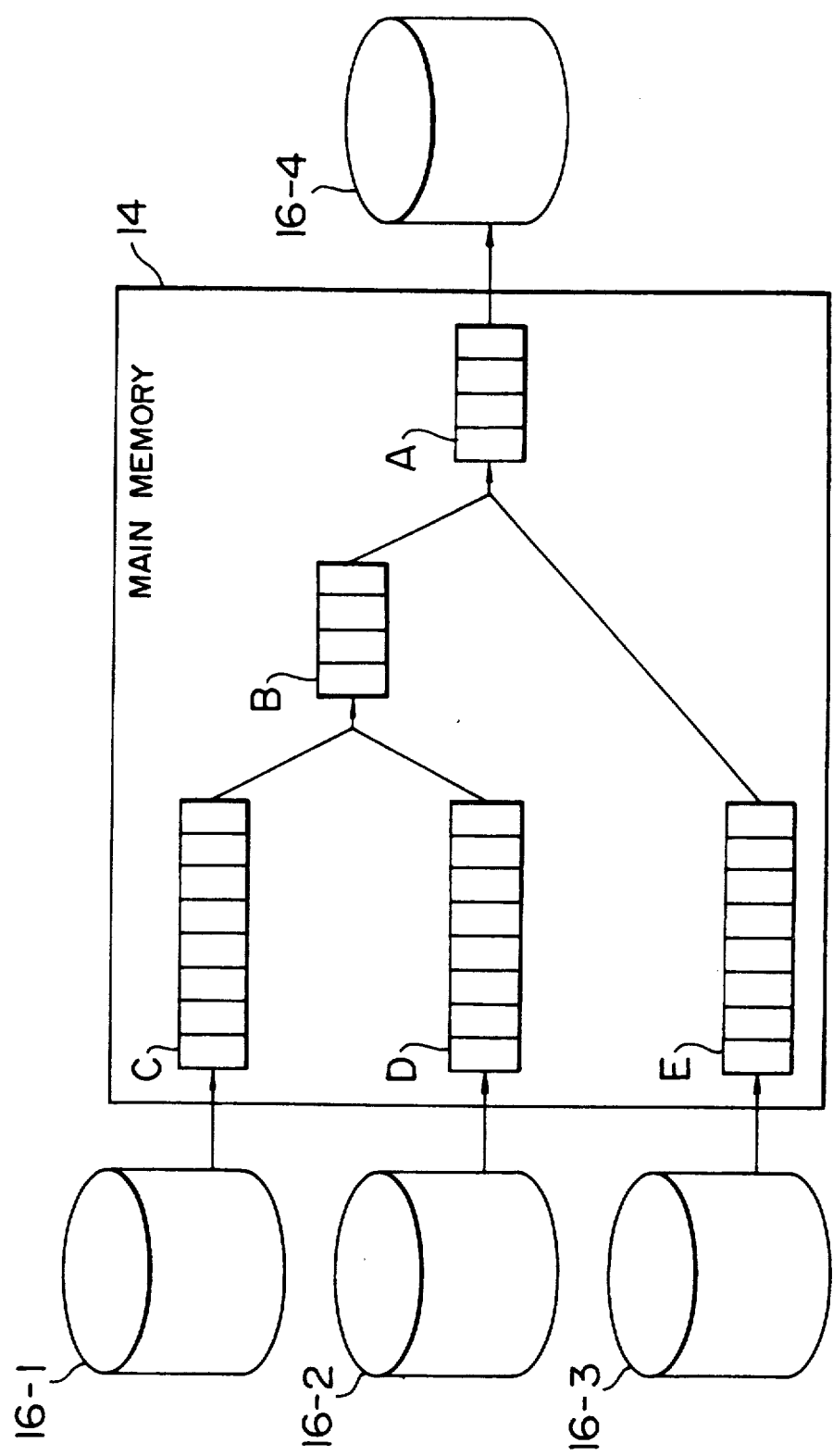
FIG. 6 is a diagram showing the working areas of the embodiment of FIG. 5.

FIG. 5 shows the algorithm of a second embodiment of the inventive merging method, and FIG. 6 shows the relationship between the disk storages 16-1 through 16-3 and the working areas A through E in the main memory 14 of this embodiment. In FIG. 6, indicated by 14 is the main memory 14 in FIG. 1, and 16-1, 16-2 and 16-3 are disk storages equivalent to the disk storage 16 in FIG. 1. The main memory 14 has an output area A, an intermediate area B, and input areas C, D and E. A and B are equal in size, and C, D and E are each twice the size of B in this embodiment, although the area B may be larger than A, and the areas C, D and E may be larger than twice the size of A.

In step 30 of FIG. 5, it is indicated that data is loaded from the disk storages 16-1, 16-2 and 16-3 into the areas C, D and E, respectively, and the counters 18 for the areas and the addresses of data in the areas are set in the address control circuit 19. In step 31, it is indicated that step 32 and following steps are repeated until merging for all data is completed. In step 32, it is indicated that the quantity of data entered to the area A is set as a number of vector elements of the vector operation unit 13. Step 33 is to test whether merging of data in the intermediate area B and input area E is feasible. Since the area E contains more data than would be entered in the area A, as will be described later, merging is feasible if the number of data in B is more than the number of vector elements. In this case, step 34 for merging and updating the counter and address takes place. If merging is not feasible, the control sequence proceeds to step 35. In step 35, it is indicated that the number of data entered to the vacant area of B is set as a number of vector elements of the merging unit 17. In step 36, it is indicated that merging is executed between the areas C and D, and the counters and address are updated. In step 37, it is indicated that merging is executed between the areas B and E, and the counters and address are updated. In step 38, it is indicated that data in the area A is stored in the disk storage 16-4. Step 39 is to test whether a vacant area as large as the size of A is available in the area C, D or E. If the area is found available, step 40 is executed for entering data and updating the counters and addresses, or otherwise nothing takes place. Due to the processes of steps 39 and 40, the areas C, D and E always contain more data than that entered in A.

The areas A, B, C, D and E are fixed in size and location, and therefore are independent of the data quantity. On this account, mass data can be merged using smaller working areas, with the input and output operations being performed independently or in parallel.

Figure 7:
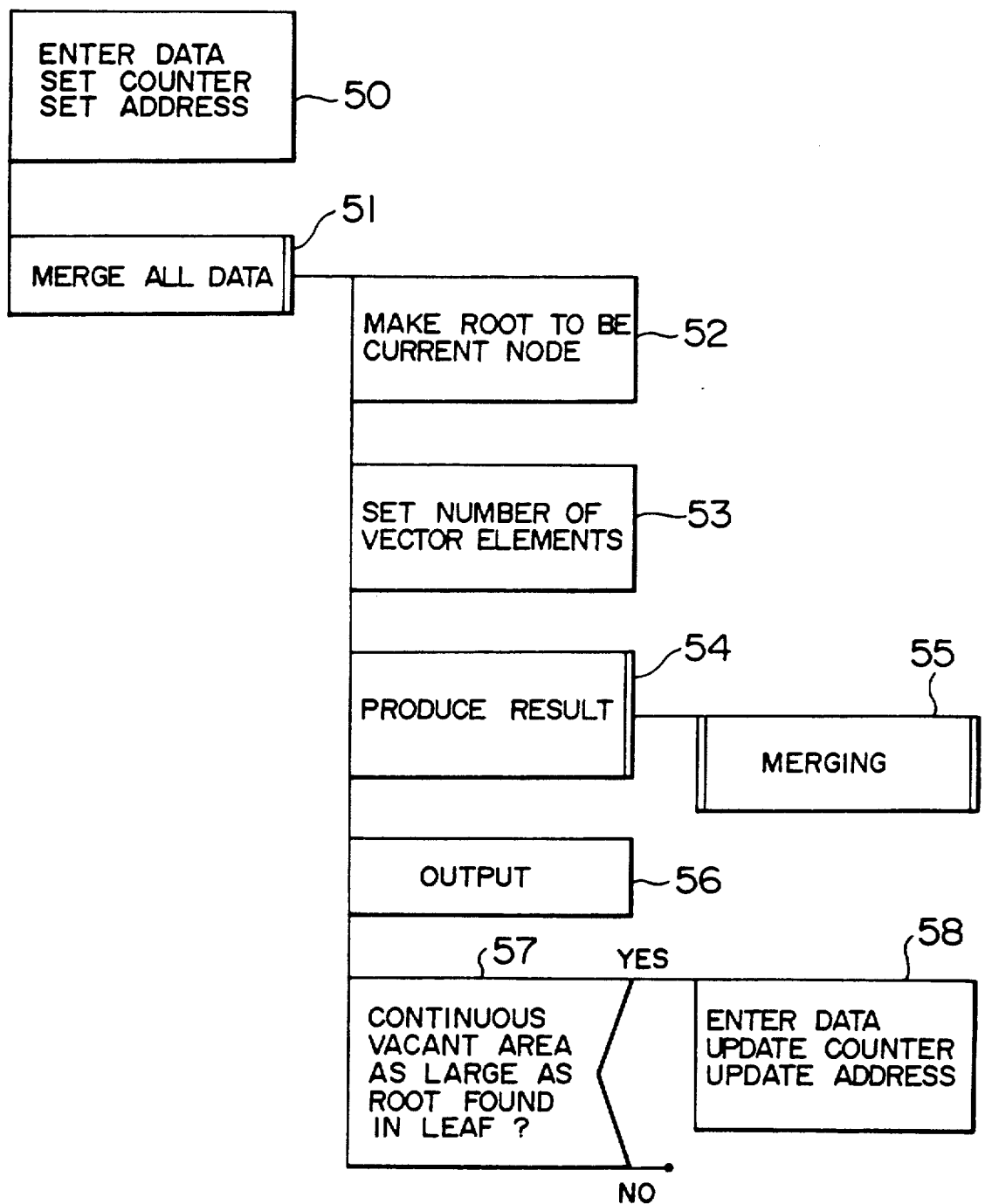
FIG. 7 is a diagram showing the algorithm of the third embodiment of the inventive merging method.
Figure 8:
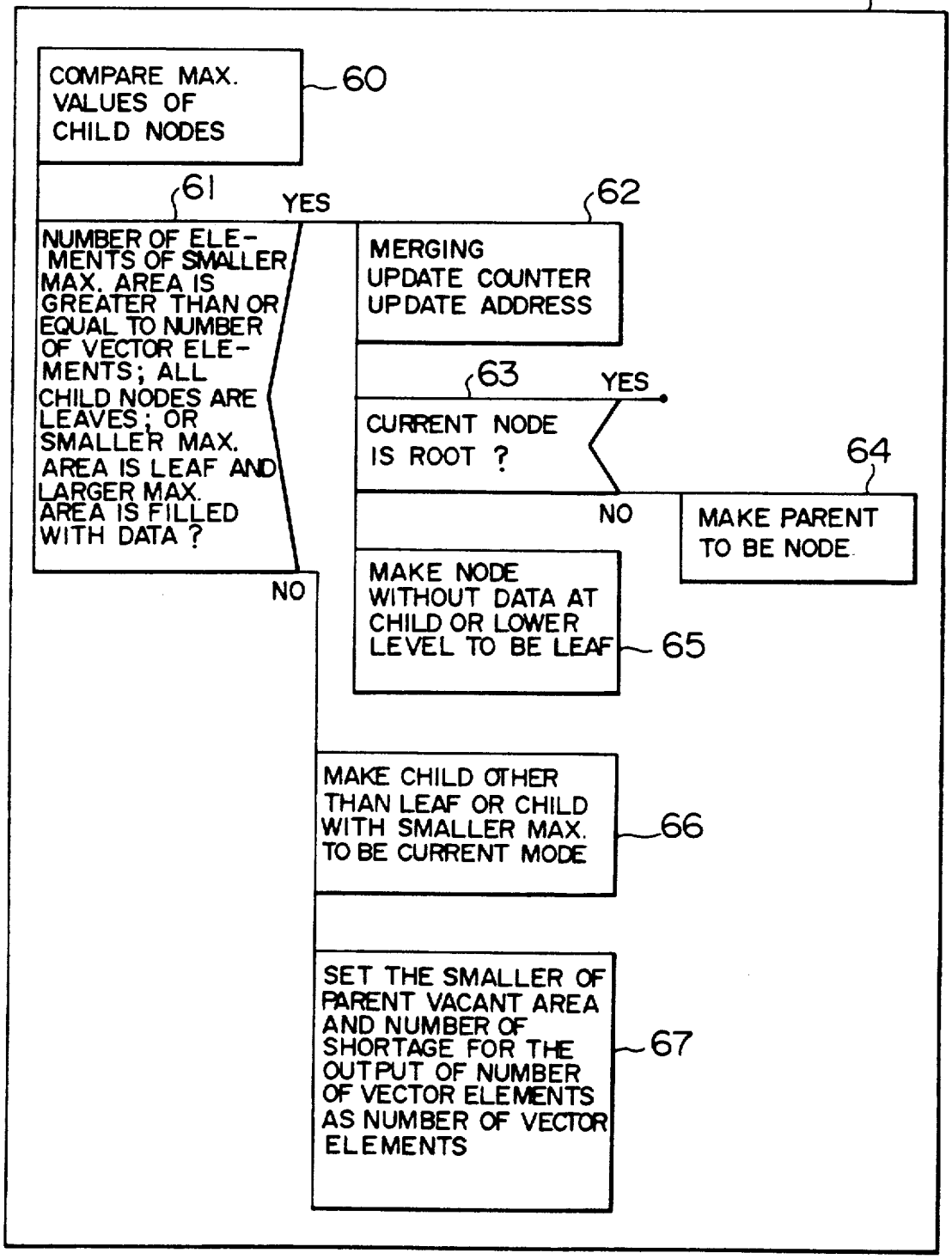
FIG. 8. is a diagram showing the algorithm of merging process.
Figure 9:
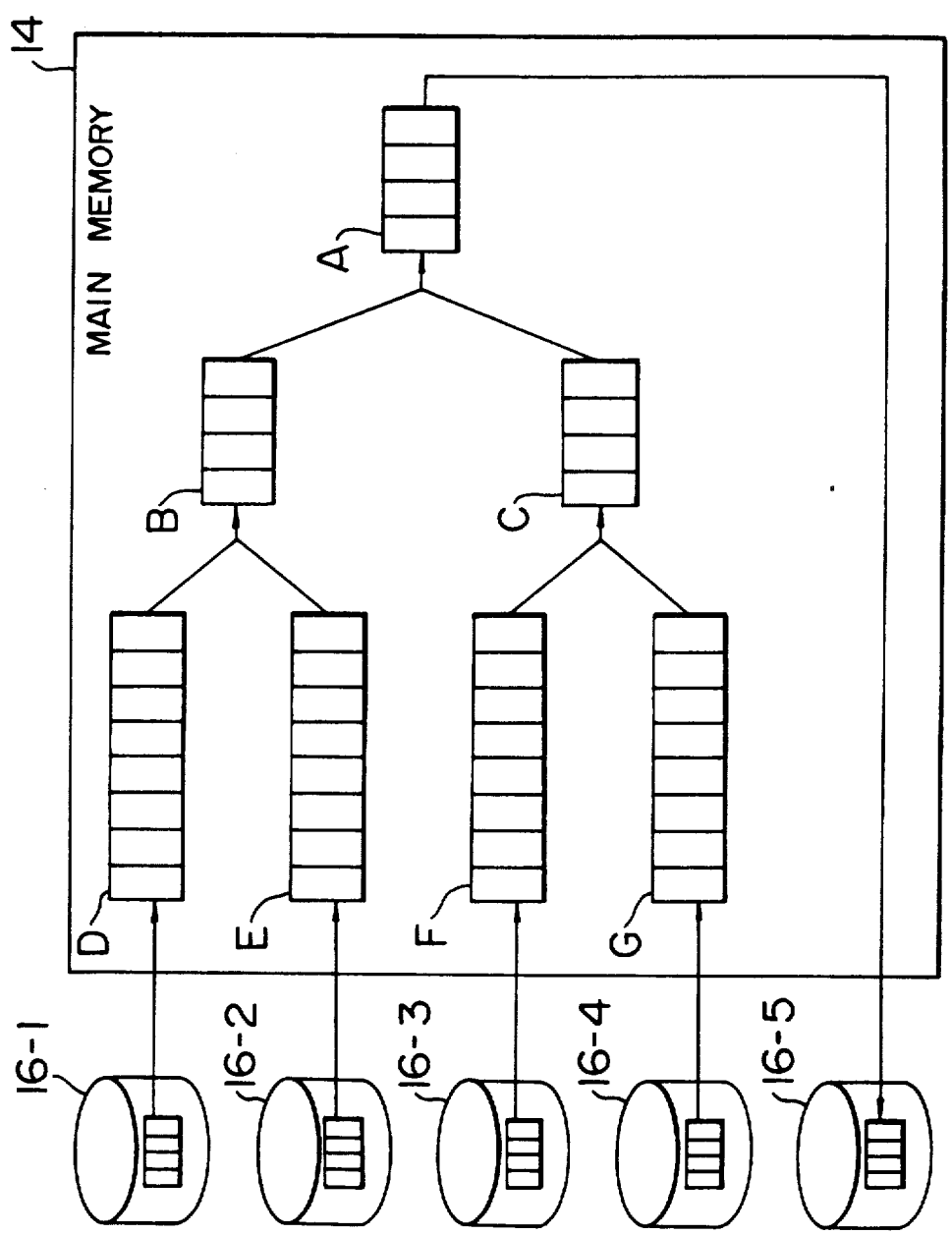
FIG. 9 is a diagram showing the working areas of the embodiment, of which a step of FIG. 7 is shown in more detail.
Figure 11:
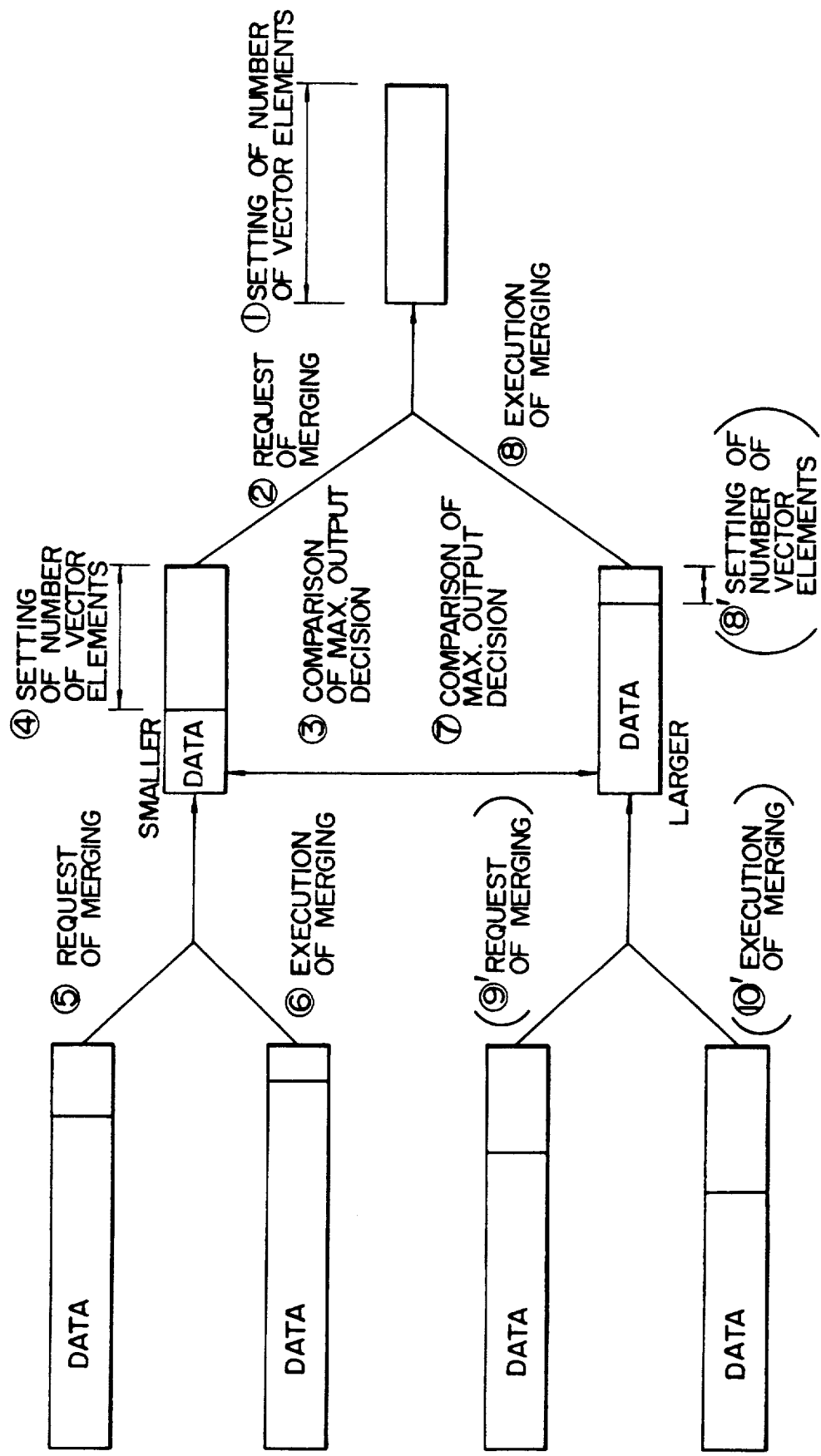
FIG. 11 is a diagram useful for explaining the process of the embodiment of FIG. 7.

FIGS. 7 and 8 show the algorithm for a third embodiment of the inventive merging method, FIG. 9 shows the relationship between the data areas, FIG. 10 shows in a table the relationship between the areas, FIG. 11 shows the process based on the algorithm of FIGS. 7 and 8, and FIGS. 12-1 and 12-2 show examples of processing.

Figures 1, 16:
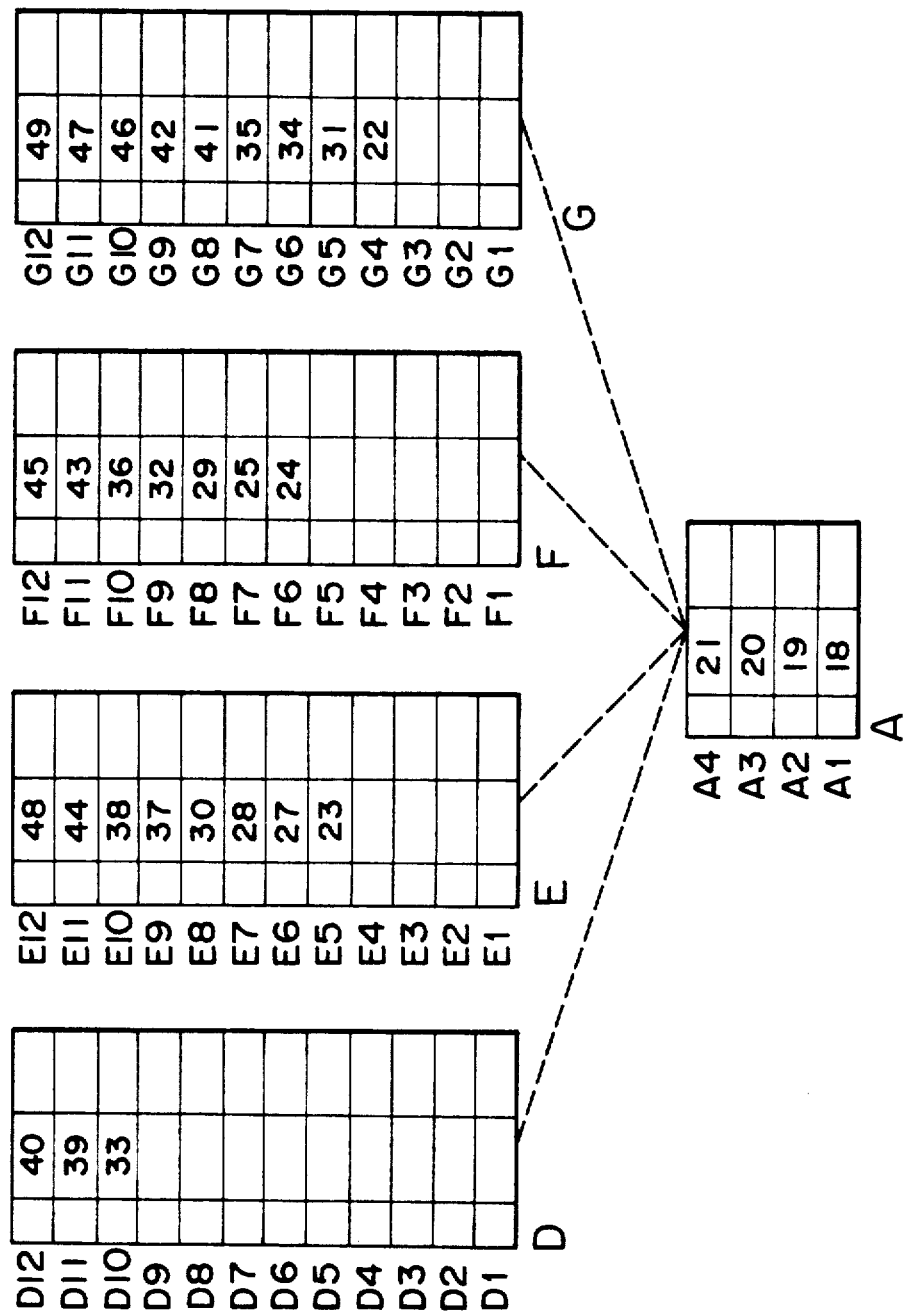
Figures 2, 16:
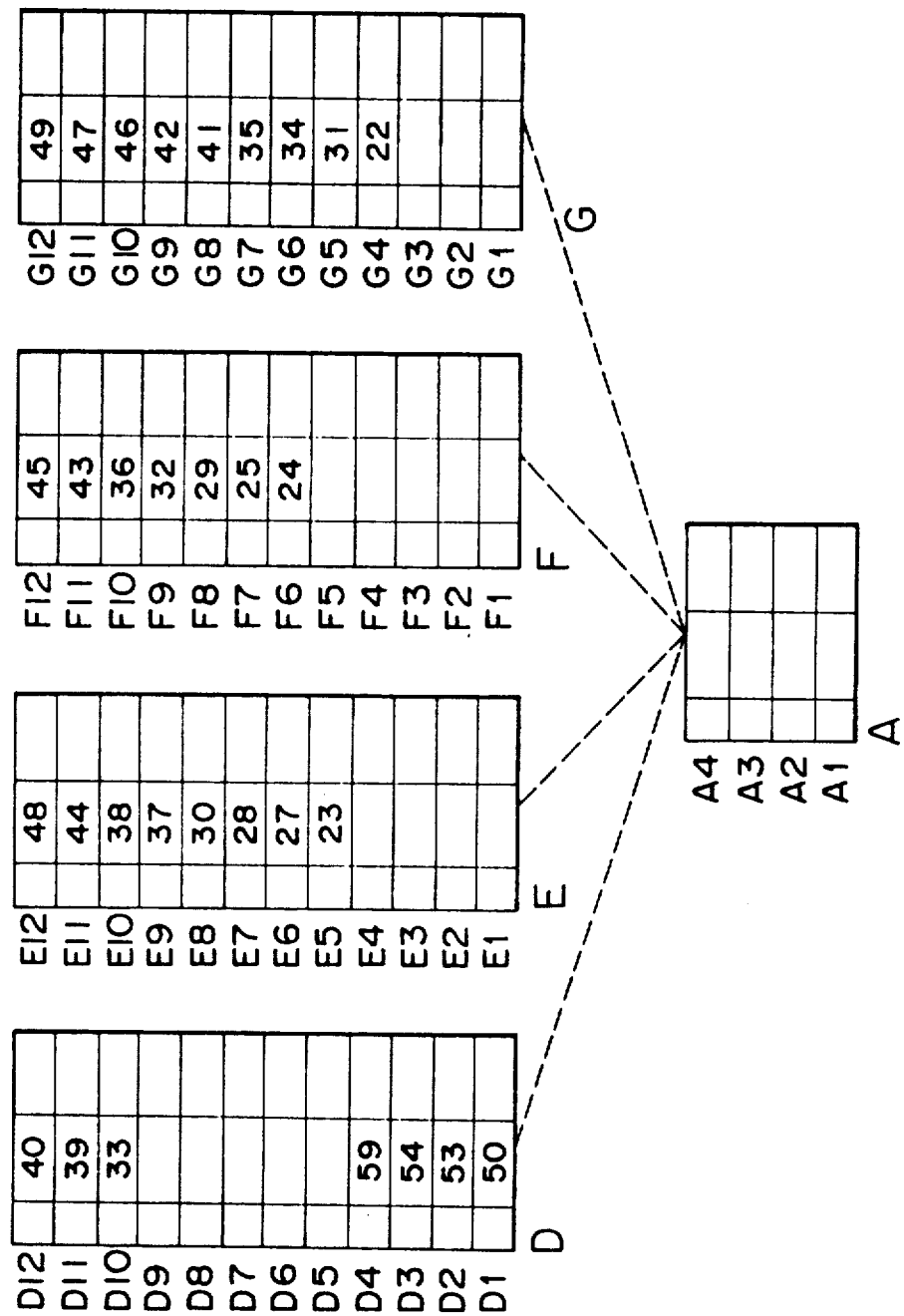
Figures 3, 16:
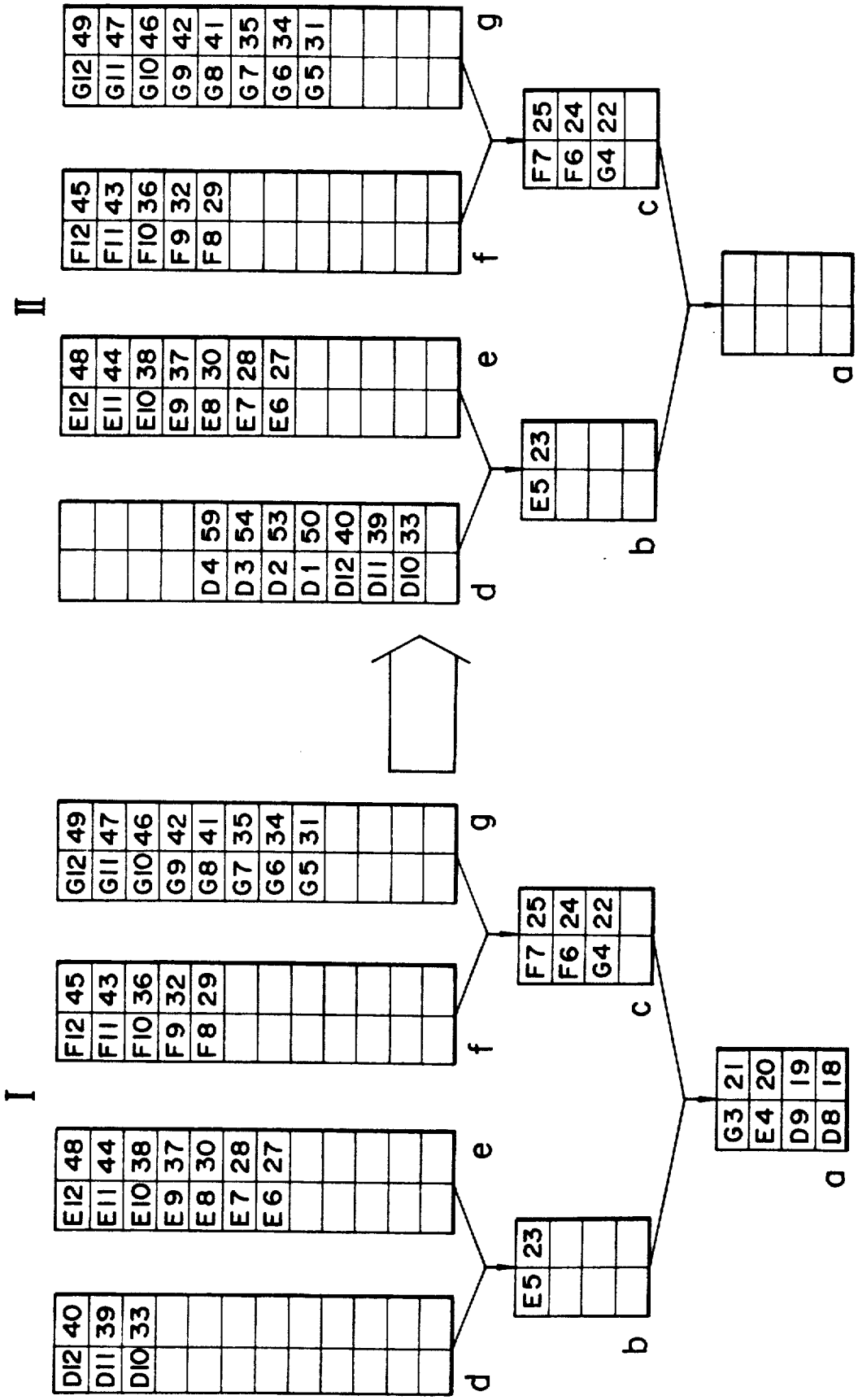

First, the relationship between the data areas will be explained with reference to FIGS. 9 and 10. In FIG. 9, indicated by 14 is the main memory 14 shown in FIG. 1, and 16-1 through 16-5 are disk storages equivalent to 16 in FIG. 1. The main memory 14 has an output area A, intermediate areas B and C having the same size as A, and input areas D, E, F, and G each having a size twice that of A. The areas B and C may be larger than A, and the areas D, E, F, and G may be larger than twice the size of A or B.

The areas A, B, C, D, E, F, and G are called "nodes", and specifically A is called "root" and D, E, F and G are called "leaves". B and C are children of A, while A is a parent of B and C. D and E are children of B, while B is a parent of D and E. F and G are children of C, while C is a parent of F and G. In the table of FIG. 10, the first column contains nodes, the second column contains parents, and the third and fourth columns contain children. The contents of fields with symbol "*" are arbitrary characters. The fifth column contains the count values of counters, which represent the number of data in the nodes. The sixth column contains the starting addresses of data. The seventh column contains leaf flags having "1" in the case of the leaf, or otherwise "0", and the leaf flags are used for detecting leaves at data entry.

Next, the diagrams of FIGS. 7 and 8 will be explained with reference to FIGS. 9, 10 and 11. FIG. 11 shows the sequence of the process for the data areas in the main memory 14 in FIG. 9. In step 50 of FIG. 7, it is indicated that data is entered to the areas D, E, F, and G of FIG. 9, and counter data and starting addresses of FIG. 10 are set. Step 51 indicates that step 52 and following steps are repeated until all data has been merged. Step 52 indicates that the pointer is set to area A, i.e., the root is designated as the current node. Step 53 indicates that the number of data entered to area A of FIG. 9 which is the current node, i.e., root, is set as a number of vector elements for two-way merging carried out by the vector operation unit 13. This is process 1 in FIG. 11. Step 54 indicates that the merging process is repeated until the result is produced in area A of FIG. 9, i.e., the process of step 55 in FIG. 8. Step 60 of FIG. 8 implements the maximum value comparison for child nodes for the judgement as to whether the requirement of merging shown by 2 in FIG. 11 is met. Namely, among data stored in two child nodes, maximum data of the nodes are compared. This is the former half of the process 3 in FIG. 11. Step 61 of FIG. 8 is the output decision at the latter half of the process 3 in FIG. 11. The process of step 62 takes place in any of three cases: the number of data on the side of the smaller maximum value is greater than the number of vector elements for two-way merging; both child nodes are leaves; the node with the smaller maximum value is a leaf and the node with the larger maximum value has its area filled with data, or otherwise the process of step 66 takes place. Step 62 indicates that merging is executed and the counters and data starting addresses of the table of FIG. 10 are updated. This is the process 6 in FIG. 11, for example. Step 63 is to test whether the current node is a root or not (i.e., whether or not the pointer points to a root). In case of a root, nothing takes place, or otherwise the parent node is made the current node (i.e., the pointer is moved to the parent node). This means that the current node is shifted from B to A in FIG. 9 following the process 6 of FIG. 11. Step 65 indicates that if a child or further descendant data is absent, the node is made a leaf and the flag in the table of FIG. 10 is updated. For example, in FIG. 9, if no data is left in D and E, area B is made a leaf. If area D, for example, is out of data, no data is left in the disk storage 16-1, as will be explained later. In FIG. 8, step 66 indicates that the child other than a leaf or with the smaller maximum value is made the current node. For example, the current node is moved from A to B in FIG. 9 following the process 3 in FIG. 11. Step 67 of FIG. 8 indicates that among the shortage of data of the numbers of vector elements in the vacant area of the parent and in the area of a parent of the parent (grandfather) for the output to the grandfather, the smaller quantity is set as the number of vector elements. Namely, if the vacant area of the parent is larger than the shortage, the shortage is set as the number of vector elements of the parent. This is the process 4 in FIG. 11 for example. Repeating the process of FIG. 8 results in the process of FIG. 11, and an output is produced in A in FIG. 9. In FIG. 7, step 56 indicates that the result produced in A of FIG. 9 is stored in the disk storage 16-5. Step 57 is to test whether a vacant area as large as A is available in leaf areas D, E, F and G. If the area is found, data input of step 58 and updating of counters and data starting addresses of FIG. 10 take place. If no vacant area is found, nothing takes place. Due to the steps 57 and 58, data always exists in the leaf, so far as data exists in the disk storage, and when no data is left in the leaf, no data exists in the disk storage either.

The above explanation has been the case of input data arranged in the ascending order. When input data is arranged in the descending order, phrases "maximum value comparison", "number of data on the side of the smaller maximum value", and "child with the smaller maximum value" in the steps 60, 61 and 66 should be replaced with "minimum value comparison", "number of data on the side of the larger minimum value", and "child on the side of the larger minimum value", respectively. This phrase replacement rule is also applied to the following fourth embodiment.

Figures 1, 12:
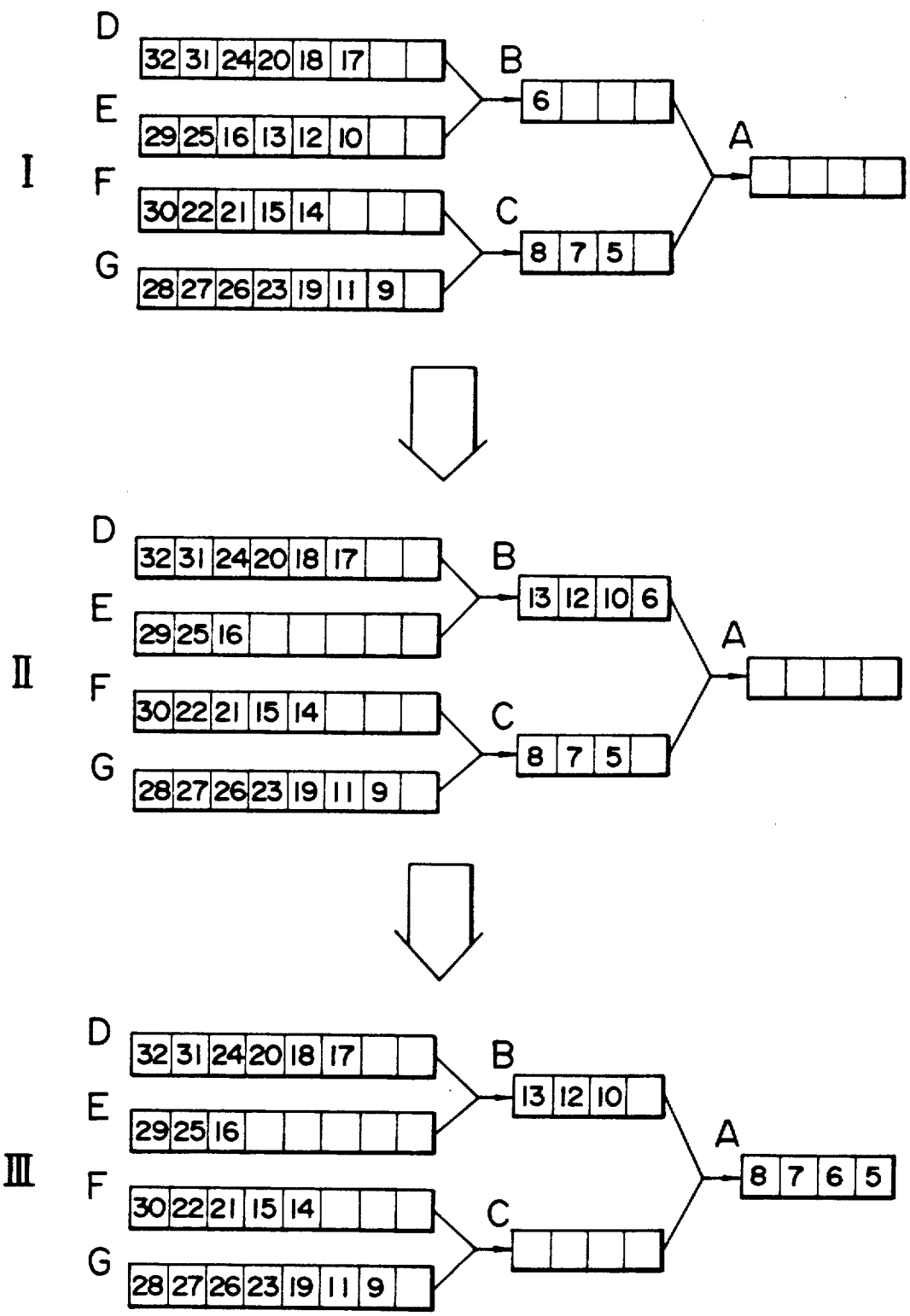
Figures 2, 12:
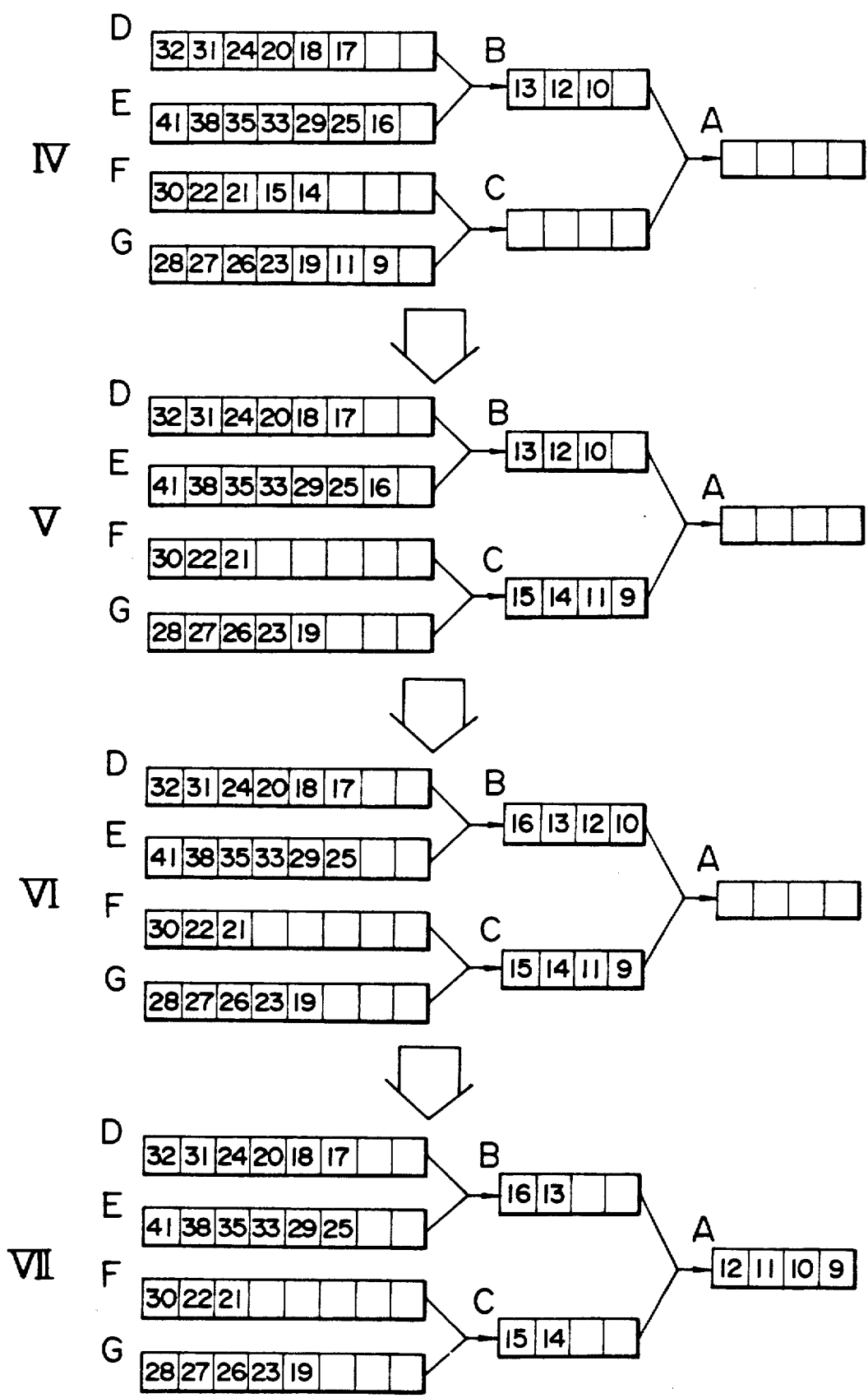

The following describes the flow of data with reference to FIGS. 12-1 and 12-2.

Shown by I in FIG. 12-1 is the case where the area A contains no data, B contains one piece of data, C contains 3 pieces of data, D contains 6 pieces of data, E contains 6 pieces of data, F contains 5 pieces of data, and G contains 7 pieces of data. The current pointer is assumed to point to A. The process of this case compares the maximum value "6" in B with the maximum value "8" in C and selects the area with the smaller maximum value, i.e., B. Since D and E have no child, merging is feasible.

The case II shows the result of merging between D and E. B has the maximum value "13" which is larger than the maximum value "8", and the sum of the number of elements of C and the number of elements in B is smaller than the maximum value of C, i.e., 1, is larger than the area A, and therefore merging between the areas B and C is feasible.

III is the result of merging between the areas B and C. If the leaves are searched for a vacant area, there is a vacant area in area E not less (equal to or larger) than the size of A.

Shown by IV in FIG. 12-2 is the case where data in the area A of case III in FIG. 12-1 is stored in the disk storage, and data in the disk storage is loaded into the area E. In comparing the maximum values in the areas B and C, the maximum value "13" is found in B, while C has no element, the latter being evaluated to be the smaller based on the assumption of "$-\infty$". The areas F and G have no child node, and therefore merging between F and G is feasible.

Case V is the result of merging between the areas F and G. Comparison of the maximum value "13" in B with the maximum value "15" in C reveals the former to be the smaller, and therefore merging between B and C is not feasible. Namely, the area B has 3 elements, and it is not known in general whether the area C has a value smaller than the maximum value of B. On this account, merging is not feasible. An element needs to be added to B. On the other hand, the areas D and E have no child node, and merging is feasible.

Case VI is the result of merging between the areas D and E. Both areas now store more data in number than the number of elements in the area A, and merging between B and C becomes feasible.

Shown by VII is a product of merging between the areas B and C held in the area A.

According to this invention, as described, the mean vector length is determined from the summed data movement value divided by the number of executions of merging instruction. The merging instruction is not executed each time a vacant area is found in the working areas. Even if a vacant area is available, the process does not take place when merging is not feasible. Therefore, the frequency of instruction execution is lowered, and data can be treated with their long vector length being retained. In addition, the process uses only areas which have been reserved in the main memory on the basis of the number of ways and input/output unit value independently of the number of data, whereby the merging process can be implemented using small memory areas.

Figure 13:
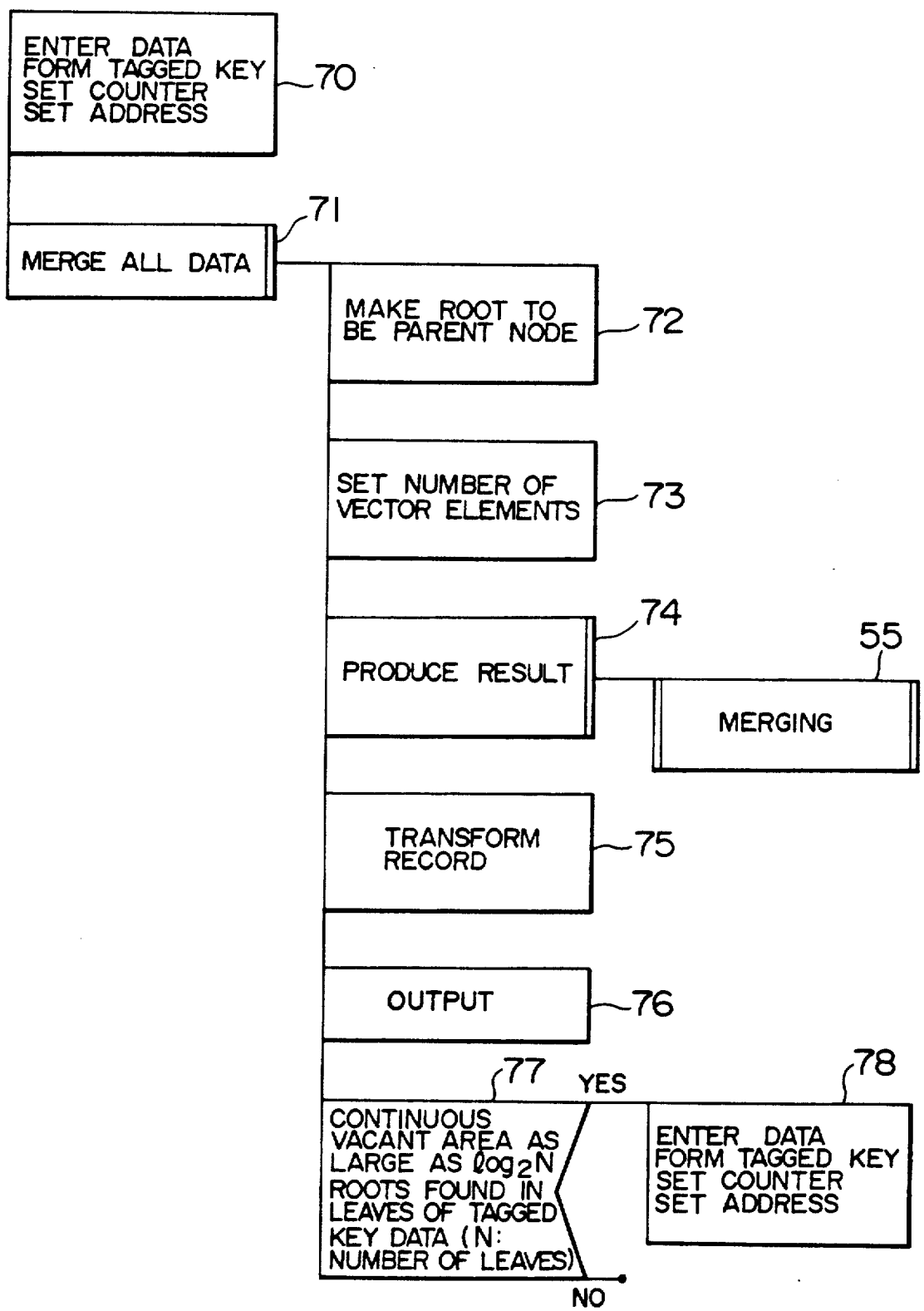
FIG. 13 is a diagram showing the algorithm of the fourth embodiment of the inventive merging method.
Figure 14:
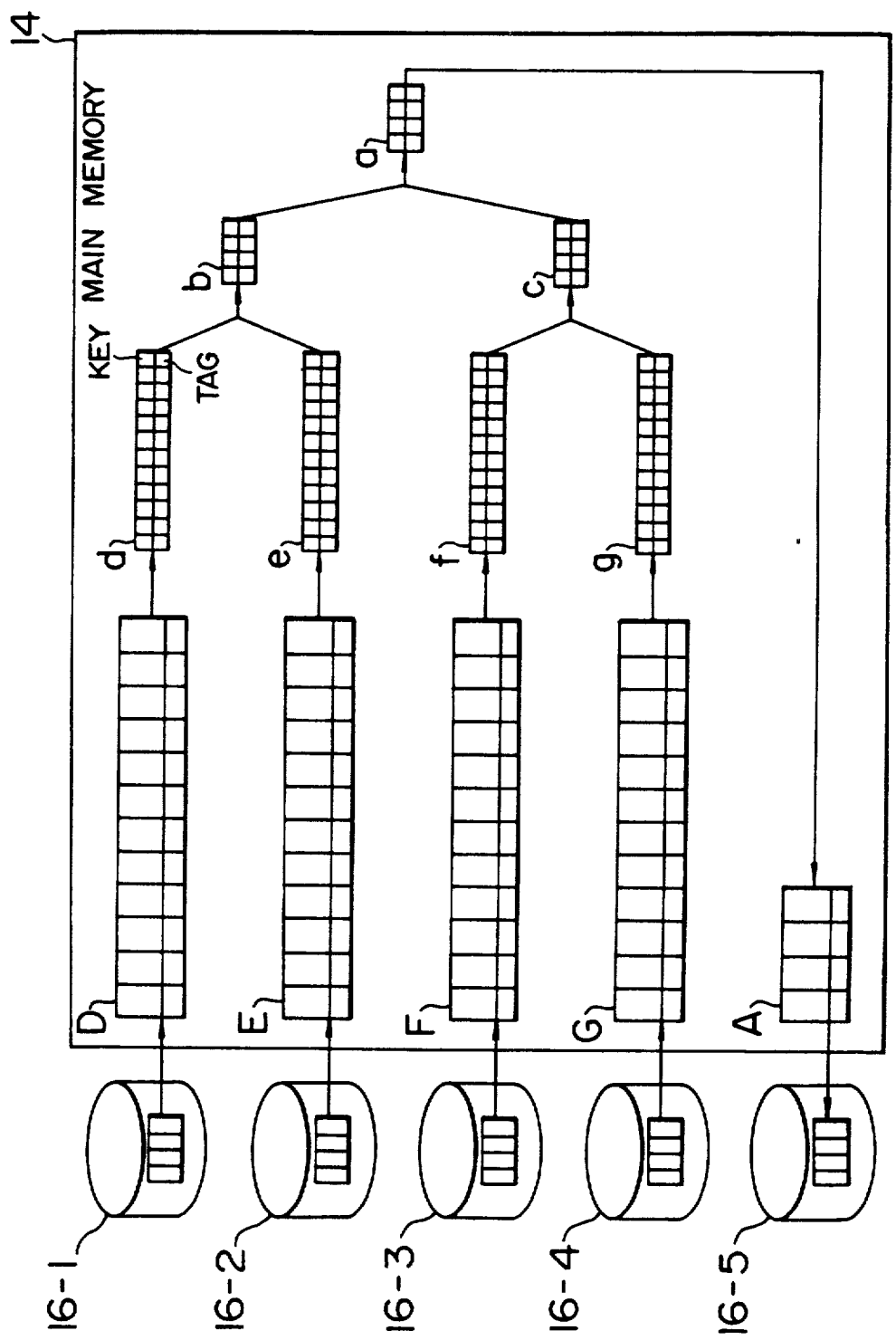
FIG. 14 is a diagram showing the working areas of the embodiment of FIG. 13.

FIG. 13 shows the algorithm of the fourth embodiment of the inventive merging method, FIG. 14 shows the relationship between the data areas, taking four-way merging as an example, FIG. 15 shows in table the relationship between the areas, and FIGS. 16-1, 16-2 and 16-3 show the flow of input/output data.

First, the relationship between the data areas will be explained with reference to FIGS. 14 and 15. In FIG. 14, indicated by 14 is the main memory 14 in FIG. 1 and 16-1 through 16-5 are disk memories equivalent to 16 in FIG. 1. In the main memory 14, indicated by A is an output area, a is an area for holding tagged data in the same number as data held in A, b and c are areas of the same size as a, d, e, f, and g are areas three times as large as a, and D, E, F and G are areas for holding data in the same number as tagged data held in d, e, f and g, respectively. The areas b and c generally have sizes equal to or larger than a, and the areas d, e, f, and g are generally given a size $(\log_2 N)+1$ times larger than b and c. The areas d, e, f and g are used to hold key data sliced from input data in D, E, F and G, respectively, with a tag being appended thereto, b is used to hold the merging result of d and e, c is used to hold the merging result of f and g, and a is used to hold the merging result of b and c. The key data is such information as the commodity number, for example, when taking an example of a set of records comprising a commodity number, commodity name, price, quantity of stock, etc. for each commodity, and this forms a code shorter than the code of the commodity name. Tagged key data in a transformed back to the original input data is entered to A.

The areas a, b, c, d, e, f, and g will be called "nodes". Specifically, a will be called "root", and d, e, f and g will be called "leaves". b and c are children of a, while a is a parent of b and c, d and e are children of b, while b is a parent of d and e. f and g are children of c, while c is a parent of f and g. In the table of FIG. 15, the first column contains nodes, the second column contains parents, the third and fourth columns contain children, the fifth column serves for counters indicating the number of data in the nodes, the sixth column contains the starting addresses of tagged key data in the nodes, the seventh column contains the starting addresses of input data areas, the eighth column serves for test flags 1 indicating a leaf by "1" or no leaf by "0", and the ninth column serves for flags 2 taking three values of "0", "1" and "2" for specifying the input position of data. As an example of the flags 2, in FIG. 14, the right-most four data elements are given a flag value of "0", the intermediate four data elements are given a flag value of "1", and the leftmost four data elements are given a flag value of "2". Symbol "*" signifies an arbitrary character. In the case of N-way merging, the flag 2 generally takes the number defined by $(\log_2 N)+1$ of values, i.e., "0", "1", —, $\log_2 N$.

Next, the diagram of FIG. 13 will be described with reference to FIGS. 14 and 15. Step 70 in FIG. 13 indicates that data is entered to D, E, F and G, tagged keys are produced in d, e, f and g, and the counters and the starting addresses of tagged key data in FIG. 15 are set. Step 71 indicates that step 72 and the following steps are repeated until all data has been merged. Step 72 indicates that the pointer is placed at the area a, i.e., the root is specified as the current node. Step 73 indicates that the quantity of tagged key data entered to a in FIG. 14 is set as a number of vector elements. Step 74 indicates that the merging process 55 is repeated until the result is produced in a. The merging process of step 55 is the process shown in FIG. 8, and the merging process of the third embodiment is used for the tagged key. Step 75 indicates that input data is re-arranged in accordance with the result produced in a, and it is placed in A. Step 76 indicates that data is stored in the disk storage 16-5. Step 77 is to test whether a continuous vacant area as large as two times the size of a (that is, $\log_2 N$ times the size of a and N=4 in this particular case) is available in the areas d, e, f and g in FIG. 14. If the area is found available, the sequence proceeds to step 78, or otherwise nothing takes place. Step 78 is the process of entering data to D, E, F, and G in FIG. 14. Since the numbers of data in D and tagged key data in d are different in general, the input control is carried out as follows. In case a vacant continuous area of twice the size of a is available in d, there is a continuous vacant area equal in size to a in D, and data is entered to this area. The first data entry is at the top of the area, the second data entry is at a position offset by the size of a from the top, and the third data entry is at a position offset by twice the size of a from the data area. The fourth data entry is at the same position as the first entry, and the data input operation continues cyclically. The entry position is indicated by the flag 2 in the table of FIG. 15, i.e., "0" for the first entry, "1" for the second entry, and "3" for the third entry. In this situation, step 78 indicates the entry of data, which is followed by updating of the flags 2, formation of tagged key data from the input data, and setting of the counters and the starting addresses of tagged key data.

FIGS. 16-1, 16-2 and 16-3 are diagrams showing the transfer of input/output data, the transfer of tagged key data, and their relationship. In FIGS. 16-1 and 16-2, indicated by A1, A2, A3 and A4 are addresses of data in the area A. Indicated by D1, D2, and so on are counterparts of the respective areas. Shown in FIG. 16-1 is the merging result in the area A, while shown in FIG. 16-2 is output of data from the area A and input to the area D. Data input takes place when a vacant area of eight or more is available in the areas d, e, f and g.

FIG. 16-3 shows the transfer of data at the transition from FIG. 16-1 to FIG. 16-2. Shown by I of FIG. 16-3 is the result of merging obtained in the area a. Replacement of tagged key data in the area a with input data results as shown in FIG. 16-1. Shown by II of FIG. 16-3 is the formation of tagged key data from input data of FIG. 16-2 and entry to the area d. In regard to FIGS. 16-1, 16-2 and 16-3, the numbers of data in the areas D, E, F and G and in the areas d, e, f and g are different in general. This is because the intermediate result is dependent on the areas b and c. This invention is designed to inquire as to a vacant area in the areas d, e, f and g on the basis of the element counters, and data input can take place without checking a vacant area in the areas D, E, F and G. Accordingly, counters for input data are not needed and a vacant area in the areas D, E, F and G is not checked. This results in a faster data entry. The merging process uses the same algorithm as the third embodiment, and the same effectiveness, i.e., the merging process in smaller areas while retaining a long vector length, is accomplished.

FIG. 17 is a timing chart of two-way merging which involves input and output instructions, scalar instruction, and vector instruction in the first through fourth embodiments of the inventive merging method. Scalar instruction are instructions processed with the scalar operation unit in FIG. 1, and they are equivalent to steps 1-3 and steps 5-7 in FIG. 3. Vector instructions are instructions processed with the vector operation unit 17 in FIG. 1, and they are equivalent to step 4 in FIG. 3.

Implemented at the beginning is the input process for entering data into the input data areas. Next is the setting for the number of vector elements and the process by the scalar instructions for testing the feasibility of merging, and it is followed by merging by the merging instructions. The scalar and merging instructions are executed cyclically and, when resulting data is yielded in the output area, the output process commences, which is accompanied by another input process when necessary. These processes go on in overlapped fashion between the input/output and scalar instructions or between the input/output and merging instructions.

According to this invention, the size of working areas does not depend on the number of data. The mean vector length is determined from the total number of transferred data divided by the number of executions of vector instructions, which can be minimized according to this invention, whereby data can be processed using small working areas while retaining a long vector length. In addition, input and output are independent and therefore can take place in parallel.

I claim:

1. A three-way merging apparatus for connection to a first storage, in which three input data strings are stored, and a second storage, and operative to merge said three input data strings and store the result in said second storage, said apparatus comprising:
   work areas in memory including a first area for storing a first of said three input data strings sequentially, a second area for storing a second of said three input data strings sequentially, a third area for storing a third of said three input data strings sequentially, a fourth area for storing a result of merging between data stored in said first and second areas, and a fifth area for storing a result of merging between data stored in said fourth area and third area, said fourth area having a size at least equal to the size of said fifth area, said first, second and third areas each having a size at least twice the size of said fourth area;
   two-way merging means for executing a two-way merging; and
   means for controlling said first and second storages and said two-way merging means to cause storing of a result of merging from said fifth area unit into said second storage, said controlling means including:
   (a) means responsive to a vacant area in one of said first, second and third areas becoming available for a number of data, which are stored in said fifth area as a result of execution of said two-way merging, for loading a part of a data string which is to be loaded in said one of said first, second and third areas into said vacant area;
   (b) means for setting a number of data, which can be stored in said fifth area, as a first number of data to be merged by said merging means; and
   (c) means for comparing a number of data stored in said fourth area with said first number of data, and (i) if said number of data stored in said fourth area is greater than or equal to said first number of data, for causing a merging between data in said fourth and third areas and a storing of the result obtained into said fifth area for storage into said second storage, or (ii) if said number of data stored in said fourth area is smaller than said first number of data, for setting a number of data, which can be stored in a vacant area of said fourth area, as a second number of data, and causing a first merging for said second number of data between data in said first and second areas, a second merging for said first number of data between data in said fourth area, where the result of merging is stored, and data in said third area, and a delivering of the result of the second merging to said fifth area for storage into said second storage.

2. An N-way merging apparatus for connection with a first storage, in which N data strings are stored, and a second storage, and operative to merge said N data strings and store the result in said second storage, said apparatus comprising:
   work areas in memory including N data areas for storing sequentially said N data strings, respectively, an output area for storing a result of N-way merging, and N-2 intermediate areas for storing intermediate results produced in the process of said N-way merging, said intermediate areas each having a size larger than or equal to the size of said output area, said data areas having a size at least twice the size of the maximum of said intermediate areas;
   means for indicating a linkage relation between said areas;
   two-way merging means for executing a two-way merging; and
   means for controlling said first and second storages and said two-way merging means to cause said two-way merging means to execute said two-way merging sequentially in accordance with said linkage relation, to deliver the result of merging stored in said output area to said second storage, and, when a vacant area equal in size to the maximum of said intermediate areas becomes available in at least one of said N data areas, to load data of an associated data string into said vacant area;

wherein said control means includes:
(a) means for setting a number of data, which can be stored in said output area, as a first number of data to be merged by said two-way merging means;
(b) means for assigning intermediate areas in linkage with said output area by making reference to said linkage relation indicating means;
(c) means for comparing, among assigned intermediate areas, maximum values of data stored in said assigned intermediate areas and for making a first determination as to whether merging is feasible by comparing a number of data stored in a first intermediate area, which holds a smaller maximum value or, if maximum values are equal, is an arbitrary intermediate area, with said first number of data;
(d) means for (i) determining the merging to be feasible if a number of data stored in said first intermediate area is greater than or equal to said first number of data and for operating on said two-way merging means to execute merging and to place the result of merging in said output area, and (ii) determining the merging to be not feasible if the number of data stored in said first intermediate area is smaller than said first number of data and for setting a difference between the size of said first intermediate area and the number of data stored therein as a second number of data for said merging means and making a second determination, similar to the first determination, for further intermediate areas linked to said first intermediate area as to whether merging is feasible;
(e) means responsive to said merging not being feasible for setting a difference between a number of data, which can be stored in a second intermediate area, that holds data selected based on a certain criteria, among said further intermediate areas, and a number of data stored in aid second intermediate area as a second number of data;
(f) means for iterating a determination for areas linked to said second intermediate areas, similar to said second determination, as to whether merging is feasible, and operating on said two-way merging means, if merging is determined to be feasible, to execute merging; and
(g) means for making a determination, similar to said second determination, iteratively as to whether merging is further feasible between an area where the result of merging is stored and an area to be merged with said area.

3. A merging apparatus according to claim 2, wherein said criteria is to select an intermediate area holding a smaller maximum value among said further intermediate areas, or, if maximum values are equal, select an intermediate area holding arbitrary data, as said second intermediate area.

4. A merging apparatus according to claim 2, wherein said criteria is to select an intermediate area holding a larger minimum value among said further intermediate areas, or, if minimum values are equal, select an intermediate area holding arbitrary data, as said second intermediate area.

5. A merging apparatus according to claim 2, wherein said first storage comprises N storages each storing a data string.

6. An N-way merging apparatus, for connection with a first storage, in which N data strings are stored, and a second storage, and operative to merge said N data strings and store the result in said second storage, said apparatus comprising:

means for extracting a key from input data, which is formed by said N data strings, and producing tagged key data format from the extracted key appended with a tag;
two-way merging means for executing two-way merging;
means for transforming said tagged key data back to original data;
work areas for N-way merging including N input data areas for storing said N data strings sequentially, N input key data areas for storing the tagged key data strings produced from the data stored in said N data areas, N-2 intermediate areas for storing tagged key data produced in the process of N-way merging, an output key data area for storing tagged key data produced by N-way merging, and output original data areas for storing original data corresponding to the key data stored in said output key data area, said intermediate areas each having a size at least equal to the size of the output key data area, said input key data areas each having a size at least as large as $\log_2 N + 1$ times the maximum of said intermediate areas;
means for recording linkage relation between said areas; and
means for controlling said first and second storages, said 2-way merging means, and said transforming means, and implementing said N-way merging, said control means operating to store output data, which is produced as a result of merging and stored in said output original data area, into said second storage, and to load, when a vacant area as large as $\log_2 N$ times the maximum of said intermediate areas becomes available in at least one of said N data areas, data of an associated input data string into said vacant area;

wherein said control means includes:
(a) means for setting a number of key data, which can be stored in said output key data area, as a number of data to be merged by said two-way merging means;
(b) means for assigning intermediate areas in linkage with said output key data area by making reference to said linkage relation recording means;
(c) means for comparing, between assigned intermediate areas, maximum values of key data stored in said assigned intermediate areas, and for making a first determination as to whether merging is feasible by comparing a number of key data stored a first intermediate area, which holds a smaller maximum value, or, if maximum values are equal, is an arbitrary intermediate area, with said number of merging data;
(d) means for (i) determining the merging to be feasible if a number of data stored in said first intermediate area is greater than or equal to said number of merging data, and for operating on said two-way merging means to execute merging and to place the result of merging in said output key data area, and (ii) determining the merging to be not feasible if the number of data stored in said first intermediate area is smaller than said number of merging data, and for setting a difference between the size of said first intermediate area and the number of key data stored wherein as a number of merging data and making a second determination for further intermediate area linked with said first intermediate area as to whether said merging is feasible;

(e) means responsive to said merging not being feasible, for setting a difference between a number of data, which can be stored in a second intermediate area, that holds data selected based on a certain criteria, among said further intermediate areas, and a number of data stored in said second intermediate area as a number of merging data;

(f) means for iterating a determination for areas linked directly or indirectly to said second intermediate area, similar to said second determination, as to whether merging is feasible, and operating on said two-way merging means, if merging is determined to be feasible, to execute merging; and (g) means for making a determination, similar to said second determination, iteratively as to whether merging is further feasible between an area where the result of merging is stored and an area to be merged with said area.

7. A merging apparatus according to claim 6, wherein said first storage comprises N storages each storing a data string.

8. A merging apparatus according to claim 6, wherein said criteria is to select an intermediate area holding a smaller maximum value among said further intermediate areas, or, if maximum values are equal, select an intermediate area holding arbitrary data, as said second intermediate area.

9. A merging apparatus according to claim 6, wherein said criteria is to select an intermediate area holding a larger minimum value among said further intermediate areas, or, if minimum values are equal, select an intermediate area holding arbitrary data, as said second intermediate area.

10. A method of merging two data strings stored in a first storage using a two-way merging unit and storing a result of the two-way merge in a second storage, a number of data to be merged by said merging unit for one consecutive merging operation being set by setting a number of vector elements for the merging unit operation, comprising:

(a) providing two input areas and one output area in a memory, each input area sequentially receiving a part of a respective data string, said output are temporarily storing the result of the two-way merge before said result is transferred to said second storage, said input areas each having a size at least twice the size of said output area;

(b) loading a part of each data string into a respective input area;

(c) setting, as the number of said vector elements to be operated on by said merging unit, a number representing the size of said output area;

(d) successively fetching data from either one of said input areas to said merging unit to execute said two-way merging and successively loading data obtained from said merging unit in said output area;

(e) transferring data loaded in said output area to said second storage for storage therein;

(f) detecting whether a vacant area produced in at least one of said input areas as a result of said step d) is equal in size to said output area, and if equal, loading data from the data string which is to be loaded in said one input area into said one input area until said vacant area is filled; and (g) iterating said steps d), e) and f) independently until said two data strings are completely merged.

11. A method of merging three data strings stored in a first storage using a two-way merging unit and storing a result of merging said three data strings in a second storage, a number of data to be merged by said merging unit during one consecutive merging operation being set by setting a number of vector elements for the two-way merging unit operation, comprising the steps of:

(a) providing first, second and third input areas, an output area and an intermediate area in a memory, each of said first, second and third input areas storing respectively a part of each of a first, a second and a third data string, respectively, said intermediate area storing a result of executing a two-way merge on data in said first and second input areas and said output area temporarily storing a result of executing a two-way merge on data in said intermediate area and data in said third input area before the execution result is transferred to said second storage, said intermediate area being at least equal in size to said output area, each input area having a size at least twice the size of the intermediate area;

(b) loading a part of said first, second and third data strings into said first, second and third input areas, respectively;

(c) setting, as a first number of said vector elements for the two-way merging unit operation, a number representing the size of said output area;

(d) comparing the number of data stored in said intermediate area with said first number of the vector elements;

(e) if said comparison reveals that said number of data stored in said intermediate area is not less than said first number of the vector elements, executing two-way merge on data in said intermediate area and data in said third input area and placing a result of said two-way merge in said output area;

(f) if said comparison reveals that said number of data stored in said intermediate area is less than said first-number of the vector elements so that a vacant area exists in said intermediate area, setting, as a second number of elements for the two-way merging unit operation, a number representing a size of said vacant area existing in said intermediate area, executing two-way merge on data in said first and second input areas and placing a result of said two-way merge in said intermediate area, and subsequently executing two-way merge on data in said intermediate area and said third input area and placing a result of said two-way merge in said output area;

(g) transferring the result placed in said output area to said second storage;

(h) if a vacant area equal in size to said output area becomes available as a result of the step e) or f) in at least one of said first, second and third input areas, loading a part of the data string which is to be loaded in said one of the first, second and third input areas into said vacant area; and (i) iterating said step c), said steps d), e) and f), said step g) and said step h) independently until said three data strings are merged.

12. A method of N-way merging N data strings stored in a first storage using a two-way vector-merge unit and storing a result of the N-way merge in a second storage, the number of data items to be merged by the two-way vector-merge unit during one consecutive merging operation being set by setting the number of vector elements for the two-way vector-merge unit operation, said method comprising the steps of:

(a) providing in a memory a group of N input data areas, an output data area and N-2 intermediate areas, each input data area storing, part-by-part, successively, a respective input data string from said first storage, said output area temporarily storing a plurality of data items representing a result of said N-way merge before the N-way merge result is transferred to the second storage, each intermediate area storing a plurality of data items representing a result of an intermediate two-way vector-merge operation, each input data area having a size twice that of an intermediate area, each of areas constituting a group of highest-ranking intermediate areas being connected to store therein the result of a two-way merge executed on two input data areas, no highest-ranking intermediate area being provided for a remaining input data area in the case of N being an odd number, one or two lowest-ranking intermediate areas being connected to store in the output area a result of a two-way merge executed on one lowest ranking intermediate area and another area belonging to that group of input data areas which includes an odd number of data areas, or on said two lowest-ranking intermediate areas, an arbitrary intermediate area, excluding highest ranking ones, being connected to store a result of two-way merge on two areas included in a group of intermediate areas which rank immediately-preceding the arbitrary intermediate area, but when only one are is available instead of said two means, said arbitrary intermediate area is connected to store therein a result of two-way merge on said one area and another area contained in a group of intermediate areas which ranks higher than said one area and which has odd-number areas or said remaining input data area, if no such another area is available, each of the N-2 intermediate areas and the output data area being denoted as a node and, looking at a particular node, each of two nodes linked to said particular node being denoted as a child node, and the particular node being denoted as a parent node;

(b) storing a part of each of said N input data strings in a respective input area;

(c) repeating the following steps until the N input data strings are merged:

(A) designating an output data area as a current node;

(B) setting, as the number of the vector elements of the two-way vector-merge unit, a number representing the size of the output data area;

(C) determining whether the two-way merge by the two-way vector-image unit on two child nodes linked to a current node is possible on the basis of a first criteria;

(D) if determined to be possible at the step C), executing two-way merge on said two child nodes and obtaining a result of the two-way merge in the current node;

(E) if the current node is an output data area, outputting contents of the output data area into the second storage and if the current node is not an output data area, designating a parent node of the current node as a current node and going back to the step C);

(F) if a vacant area having a size which is equal to or greater than that of the output data area is present in any one of the N input data areas, supplying a part of an input data string associated with said input data area having said vacant area to the input data area; and (G) if the two-way merge is determined to be impossible at the step (C), designating a selected one of the two child nodes recited at the step C), selected by a second criteria, as a current node, updating the number of the vector elements of the merging unit so that the number of the vector elements be the smaller of a number representing the size of a vacant area present in the current node recited in the step C) and a difference between the vector element number of the two-way vector-merge unit at the step C) and the number of data items stored in the selected child node, and going back to the step C).

13. A method according to claim 12, wherein said first criteria is that the two-way merge is possible when the number of data items stored in a selected one of said two child nodes, selected on the basis of a third criteria, is not smaller than the number of the vector elements selected for the merge unit.

14. A method according to claim 13, wherein said third criteria is to select the smaller of a data item having a maximum value in the one of the two child nodes and a data item having a maximum value in the other of the two child nodes or if said maximum values are equal, to select an arbitrary one.

15. A method according to claim 13, wherein said third criteria is to select the larger of a data item having a minimum value in the one of the two child nodes and a data item having a minimum value in the other of the two child nodes, or if said minimum values are equal, to select an arbitrary one.

16. A method according to claim 12, wherein said second criteria is to select the smaller of a data item having a maximum value in the one of the two child nodes and a data item having a maximum value in the other or if said maximum values are equal, to select an arbitrary one.

17. A method according to claim 12, wherein said second criteria is to select the larger of a data item having a minimum value in the one of the two child nodes and a data item having a minimum value in the other of the two child nodes, or if said minimum values are equal, to select an arbitrary one.

* * * * *